No. 848,741. PATENTED APR. 2, 1907.
W. H. HARDMAN.
FENDER ATTACHMENT FOR CULTIVATORS.
APPLICATION FILED AUG. 31, 1906.

2 SHEETS—SHEET 1.

Witnesses
Jas. K. McCathran
W. F. Riley

Inventor
William H. Hardman,
By C. G. Siggers
Attorney

No. 848,741. PATENTED APR. 2, 1907.
W. H. HARDMAN.
FENDER ATTACHMENT FOR CULTIVATORS.
APPLICATION FILED AUG. 31, 1906.
2 SHEETS—SHEET 2.
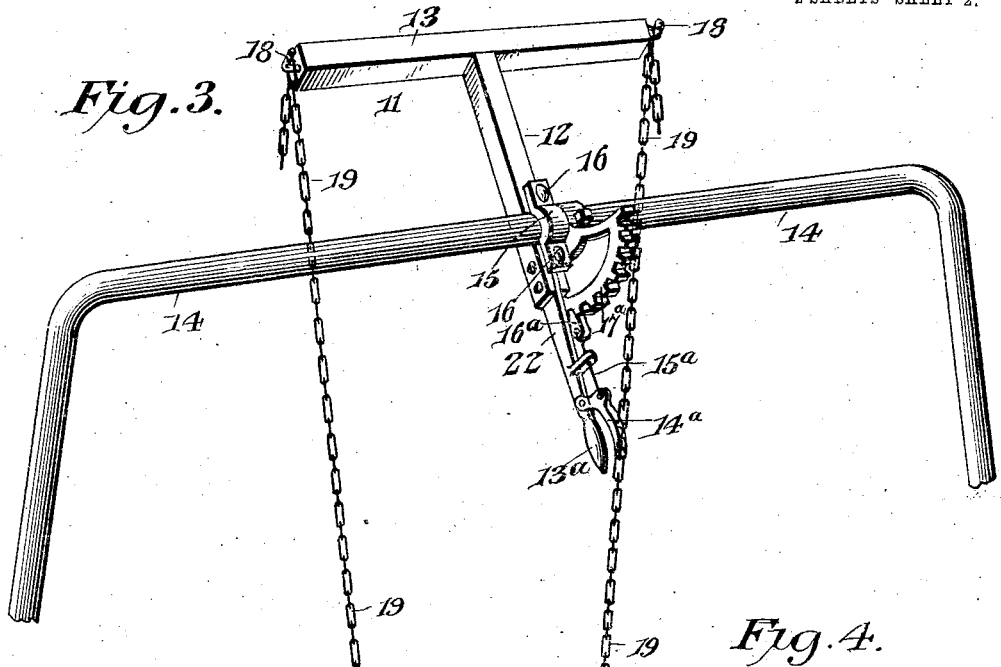
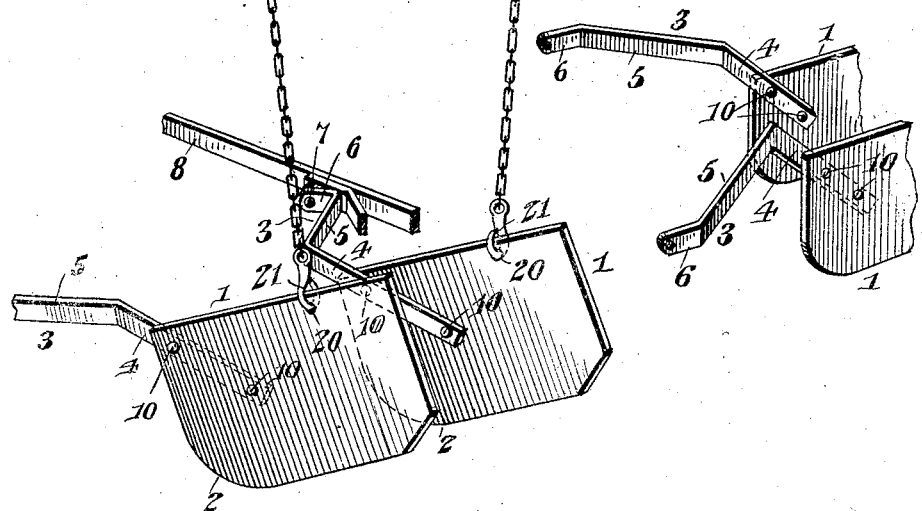
Witnesses
Jas. F. McCathran
H. F. Riley
William H. Hardman, Inventor
By C. G. Siggers
Attorney

UNITED STATES PATENT OFFICE.

WILLIAM H. HARDMAN, OF EDISON, OHIO.

FENDER ATTACHMENT FOR CULTIVATORS.

No. 848,741.   Specification of Letters Patent.   Patented April 2, 1907.

Application filed August 31, 1906. Serial No. 332,811.

*To all whom it may concern:*

Be it known that I, WILLIAM H. HARDMAN, a citizen of the United States, residing at Edison, in the county of Morrow and State of Ohio, have invented a new and useful Fender Attachment for Cultivators, of which the following is a specification.

The invention relates to improvements in fender attachments for cultivators.

The object of the present invention is to improve the construction of fenders for cultivators and to provide a simple, inexpensive, and efficient attachment adapted to be readily applied to a straddle-row cultivator and designed for protecting young corn and other plants and capable of ready adjustment either to permit the guards or fenders to rest upon the ground or to support them at the desired point above the ground.

A further object of the invention is to provide a fender attachment of this character designed particularly for use in covering grass in fields where the young plants under cultivation vary in size and adapted to be readily lowered to the ground to prevent the cultivator from covering small plants and capable of being lifted clear of the ground when the plants are of a height that does not require such protection.

With these and other objects in view the invention consists in the construction and novel combination of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 1:
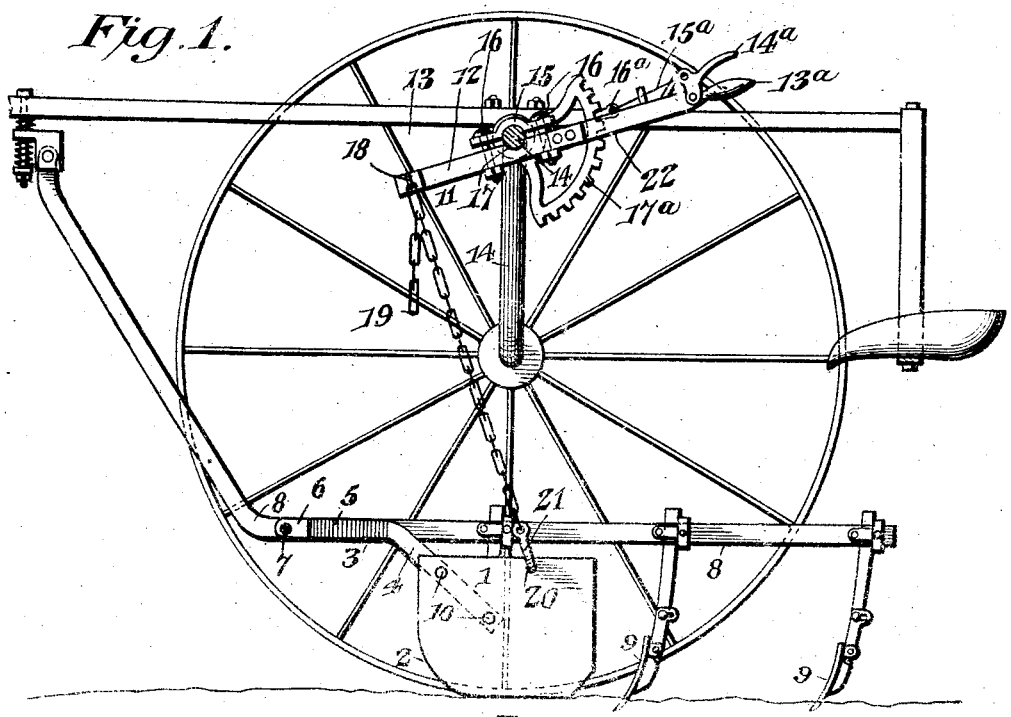
Figure 2:
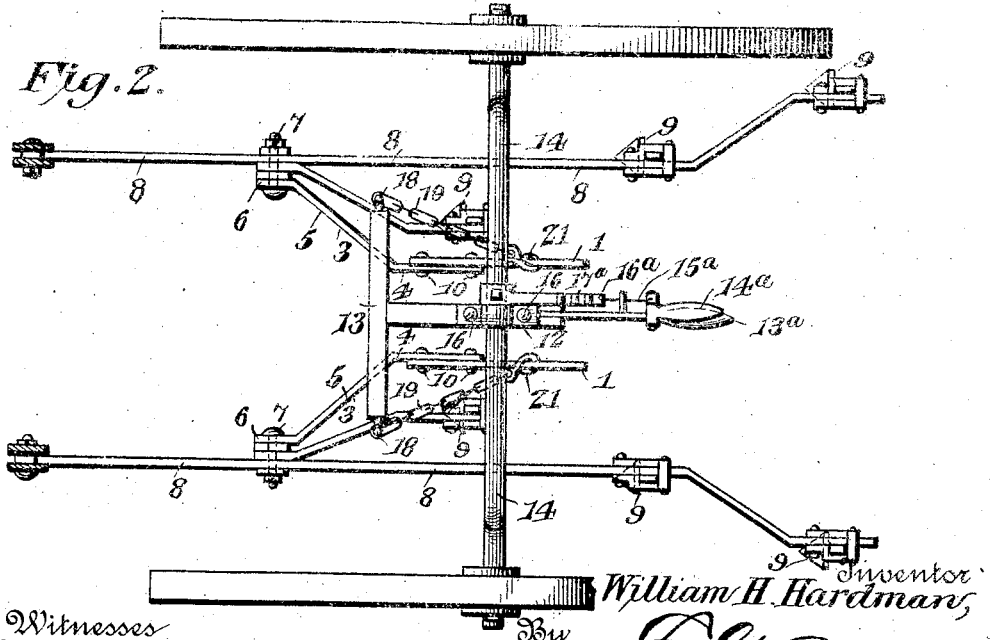

In the drawings, Figure 1 is a longitudinal sectional view of a cultivator provided with a fender attachment constructed in accordance with this invention. Fig. 2 is a plan view of the same. Fig. 3 is a detail perspective view of the fender attachment. Fig. 4 is a detail perspective view illustrating the arrangement of the arms of the guards or fenders.

Like numerals of reference designate corresponding parts in all the figures of the drawings.

1 1 designate a pair of guards or fenders constructed of sheet metal or other suitable material and consisting of approximately parallel plates arranged in substantially vertical planes and having lower horizontal edges which are adapted to rest upon the ground at opposite sides of a row of plants. The lower portions 2 of the front edges of the guards or fenders 1 are rounded and extend rearwardly to enable the guards or fenders 1 to readily pass over obstructions without injury to the attachment. The guards or fenders are provided with forwardly-extending arms 3, consisting of inclined rear shank portions 4, intermediate forwardly-diverging portions 5, and parallel front portions 6, which are perforated for the reception of pivots 7 for securing the arms of the guards or fenders to the opposite beams 8 of a cultivator. The pivots 7 consist, preferably, of the bolts for securing the front standard of the cultivator to the side beams 8, and the intermediate forwardly-diverging portions 5 space the fenders or guards from the front cultivating blades or shovels 9 of the cultivator and prevent the same from covering young plants. The rear inclined shank portions 4 are arranged at and are secured to the inner face of the guards or fenders by rivets 10 or other suitable fastening devices, and they extend downwardly and rearwardly from the upper front corners of the guards or fenders.

The pivotal connection of the fenders or guards 1 to the beams of the cultivator permit the fender to swing upwardly and downwardly to arrange them upon the ground or at the desired point above the ground, although the guards or fenders are located between the front cultivator blades or shovels in the accompanying drawings; yet it will be readily understood that when the shovels of the cultivator are arranged in any other desired manner the guards or fenders will be interposed between the plants and the blades or shovels which are closest to the same.

The guards or fenders are controlled by means of an approximately T-shaped lever 11, located above and between the cultivator-beams 8 and consisting of a longitudinal bar or member 12 and a transverse bar or member 13, centrally secured to the front of the bar or member 12 and forming laterally-projecting arms. The longitudinal bar or member 12 is fulcrumed on the arch 14 of the axle of the cultivator and is secured to the said axle by means of a clamp 15, consisting of a plate having an intermediate curved portion and straight end portions which are perforated for the reception of bolts 16. The straight end portions of the clamp are spaced from the adjacent faces of the longitudinal bar or member of the T-shaped lever, and the bolts 16, which pierce the longitudinal bar or member 12 and the ends of the clamp, are provided with nuts and are adapted to enable the lever to be securely fastened to the axle 14. The spacing of the end portions of the clamp from the longitudinal bar or member of the lever enables any wear of the parts to be readily taken up by the bolts. The bar or member is provided opposite the intermediate curved portion of the clamp with a curved recess 17 to conform to the configuration of the axle. The end of the lever opposite to that having the transverse bar or member 13 is formed into a suitable handle-grip 13$^a$, and a handle 14$^a$, pivoted to the lever adjacent to the grip 13$^a$, has a link connection 15$^a$ with a suitable dog 16$^a$. The dog 16$^a$ coöperates with a quadrant-rack 17$^a$, clamped upon the axle, and thus the lever can be held in any position desired. The T-shaped lever may be mounted on any other convenient portion of a cultivator, and the laterally-extending arms of the lever 11 are provided with terminal hooks 18 for engaging the upper ends of a pair of chains 19, which extend downwardly and rearwardly from the front of the operating-lever to the upper edges of the guards or fenders at points in rear of the centers thereof.

The guards or fenders are provided adjacent to their upper edges with perforations 20, and the chains have snap-hooks 21 or other suitable fastening devices at their lower ends for engaging the perforations or openings 20, whereby the chains are secured to the guards or fenders. The longitudinal bar or member 12 of the T-shaped lever is fulcrumed at an intermediate point on the axle 14, and the arms of the lever are located in advance of the said axle. The rear portion of the longitudinal bar or member is shaped to form a grip or handle 22, which is located within convenient reach of the operator and which is adapted to be readily swung upwardly or downwardly to lower or raise the guards or fenders. The upper ends of the chains are designed to be provided with a plurality of extra links for enabling the position of the lever to be changed to suit the operator.

It will be seen that the cultivator attachment is adapted to be readily applied to an ordinary straddle-row cultivator and that the guards or fenders may be readily lowered to the ground or raised therefrom, accordingly as the plants under cultivation are large or small.

Having thus fully described my invention, what I claim as new, and desire to secure by Letters Patent, is—

1. The combination with a cultivator having an arched axle and provided with spaced cultivator-beams arranged below the axle, of a pair of guards or fenders located in the space between the beams and movable independently thereof, and a single longitudinally-disposed lever mounted on the arched axle above and between the cultivator-beams and provided with arms connected with the fenders for adjusting the same independently of the cultivator-beams.

2. A cultivator attachment comprising a pair of movably-mounted guards or fenders adapted to be raised or lowered, and a substantially T-shaped operating-lever fulcrumed at an intermediate point and having opposite laterally-extending arms connected with the guards or fenders.

3. A cultivator attachment comprising a pair of guards or fenders adapted to be raised or lowered, a substantially T-shaped operating-lever provided at an intermediate point with a clamp for fulcruming the lever on a cultivator, and means for connecting the opposite arms of the lever with the guards or fenders.

4. A cultivator attachment comprising a pair of movably-mounted guards or fenders, an operating-lever connected with the guards or fenders and provided at an intermediate point with a bearing-recess, a clamping plate or member spaced from the lever and provided with a bearing-recess located opposite that of the lever, and adjusting devices connecting the clamping plate or member with the lever.

5. The combination with a cultivator having opposite beams and provided with an arched axle, of guards or fenders having arms pivotally connected with the said beams, an operating-lever fulcrumed at an intermediate point on the axle and provided in advance of the same with opposite arms and having a handle portion in rear of the said axle, and connections between the guards or fenders and the arms of the operating-lever.

In testimony that I claim the foregoing as my own I have hereto affixed my signature in the presence of two witnesses.

WILLIAM H. HARDMAN.

Witnesses:
BENJAMINE WERTZ,
H. H. HARLAN.